Nov. 22, 1960     H. R. TEAR     2,960,971
MAGNETIC SNAP ACTING VALVE FOR AIR MOTOR
Filed June 16, 1959     3 Sheets-Sheet 1

INVENTOR
Harry R. Tear.

By John C. Black
Attorney

INVENTOR.
Harry R. Tear

BY John C. Black
Attorney

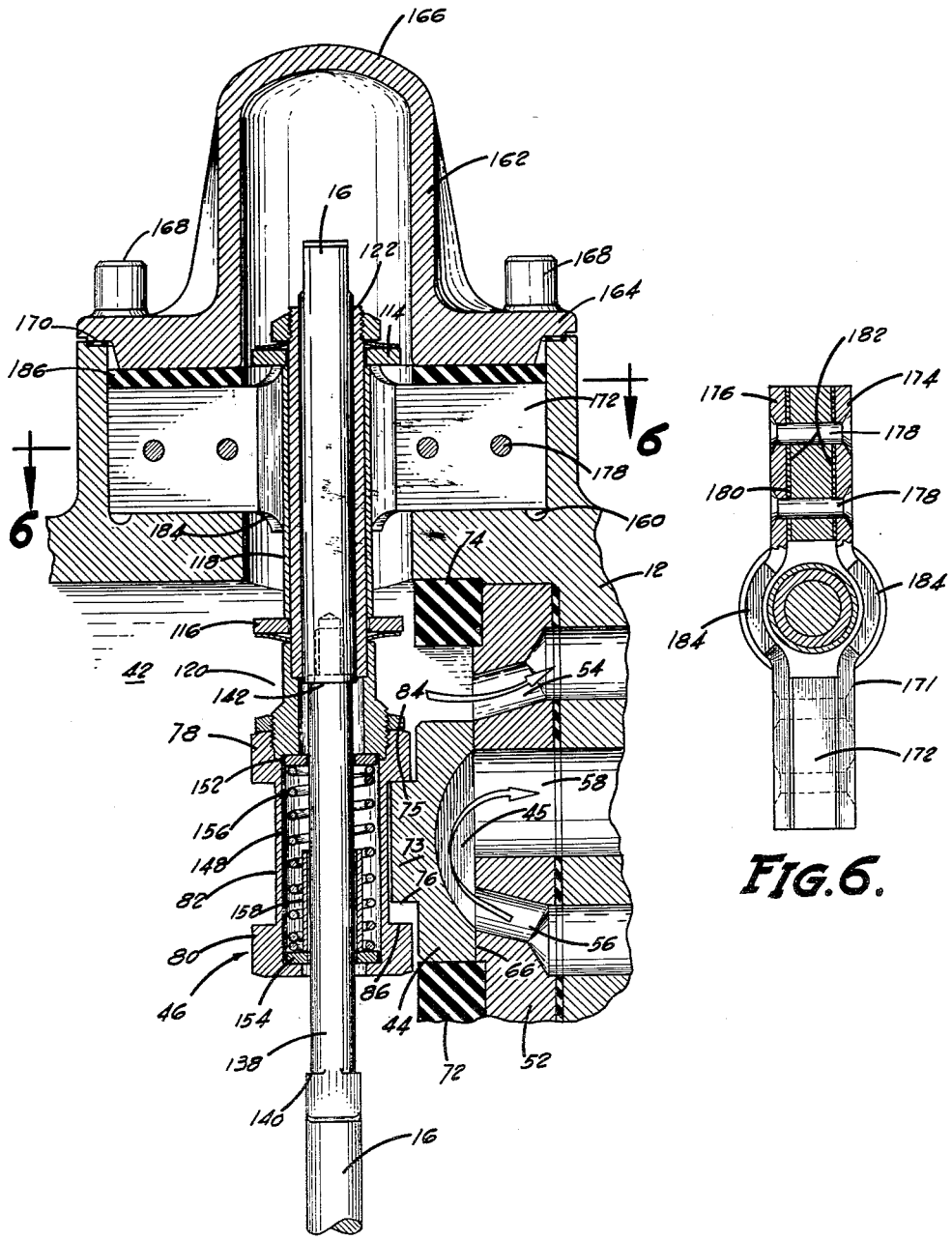

United States Patent Office 2,960,971
Patented Nov. 22, 1960

2,960,971

MAGNETIC SNAP ACTING VALVE FOR AIR MOTOR

Harry R. Tear, Evanston, Ill., assignor to Stewart-Warner Corporation, Chicago, Ill., a corporation of Virginia Filed June 16, 1959, Ser. No. 820,699

23 Claims. (Cl. 121—164)

This invention relates generally to fluid pressure-operated reciprocating motors of the type shown in U.S. Patent 2,637,304, issued May 5, 1953, and more particularly to magnetic means for providing a snap action to the oscillating D-slide valve normally associated with such apparatus.

The air motor of the above patent employs a constantly oscillating valve operator or shuttle assembly which is adapted to move a D-slide valve between either of two extreme positions to supply fluid pressure alternately to opposing sides of a reciprocating piston. In order to insure that the valve operator or shuttle assembly will move rapidly to either of the extreme positions, there is employed within the apparatus an over-center spring toggle mechanism which urges the valve operator or shuttle away from the neutral position. This construction has proved satisfactory for small to medium size motors, but when employed with the larger size fluid motors having increased operational speeds, the increased shock forces alternately applied and removed from the valve operator and its associated toggle mechanism have resulted in permanent damage to the toggle mechanism, as well as other portions of the shuttle assembly subjected to the extreme pounding inherent in the application and removal of such large forces.

It is therefore an object of this invention to provide an arrangement for moving the D-slide valve between its two extreme operating positions with a snap action which will not require an over-center toggle mechanism.

The present invention makes use of magnetic means for providing the snap action essential to moving the D-slide valve from one extreme position to the other. The basic idea of making use of a permanent magnet to provide a snap operation of a fluid valve is generally old. However, special problems arise in the air motor field, especially, with large size motors employing parts which are extremely large and rapid in their operation. Magnetic snap-action apparatus is required which will stand up under the extreme shock loads placed upon the valve-actuating mechanism.

It is therefore an object of this invention to provide magnetic snap action especially applicable to a D-slide valve of a fluid pressure-operated reciprocating motor.

It is a further object of this invention to provide a magnetic snap action arrangement for such a D-slide valve which will withstand the high shock loads inherent in said such devices.

It is a further object of this invention to provide a magnetic snap acting valve for a fluid pressure-operated reciprocating motor in which the shock loads normally experienced by the moving elements are greatly reduced.

Other objects of this invention will be pointed out in the following detailed description and claims and illustrated in the accompanying drawings which disclose, by way of example, the principle of this invention and the best mode which has been contemplated of applying that principle.

In the drawings:

Figure 5 is a vertical section of another embodiment of this invention;

Figure 6 is a horizontal sectional view taken along line 6—6 of Figure 5.

The objects of this invention are achieved by providing in one embodiment a reciprocating fluid pressure-operated motor including an oscillating trip rod driven by said reciprocating fluid motor. The trip rod carries a shuttle assembly which is movable on the trip rod to either of two extreme positions. Spring means are positioned between the trip rod and the shuttle assembly for biasing the shuttle assembly to a position intermediate of the extreme positions. A permanent magnet composed of ceramic material and imbedded in resilient cushioning means is fixedly positioned adjacent the shuttle assembly while the shuttle assembly includes a pair of armatures positioned on either side of the permanent magnet with the armatures alternately contacting opposite sides of the permanent magnet during oscillation of the shuttle. The trip rod includes means for compressing the spring means in either of two directions during oscillation of the trip rod. The bias of the spring means opposes the magnetic attraction between the armatures and the permanent magnet but is not sufficient to overcome the magnetic attraction. As the trip rod moves relative to the shuttle assembly, the biasing spring is compressed until further relative movement between these elements is prevented, whereby the shuttle assembly and its associated armature is moved away from the fixed permanent magnet allowing the spring means to move the shuttle assembly in a snap acting manner. This snap action is transferred to a D-slide valve associated with the fluid operator motor, moving the D-slide valve from one operating position to the other with a snap-like action.

Figure 1:
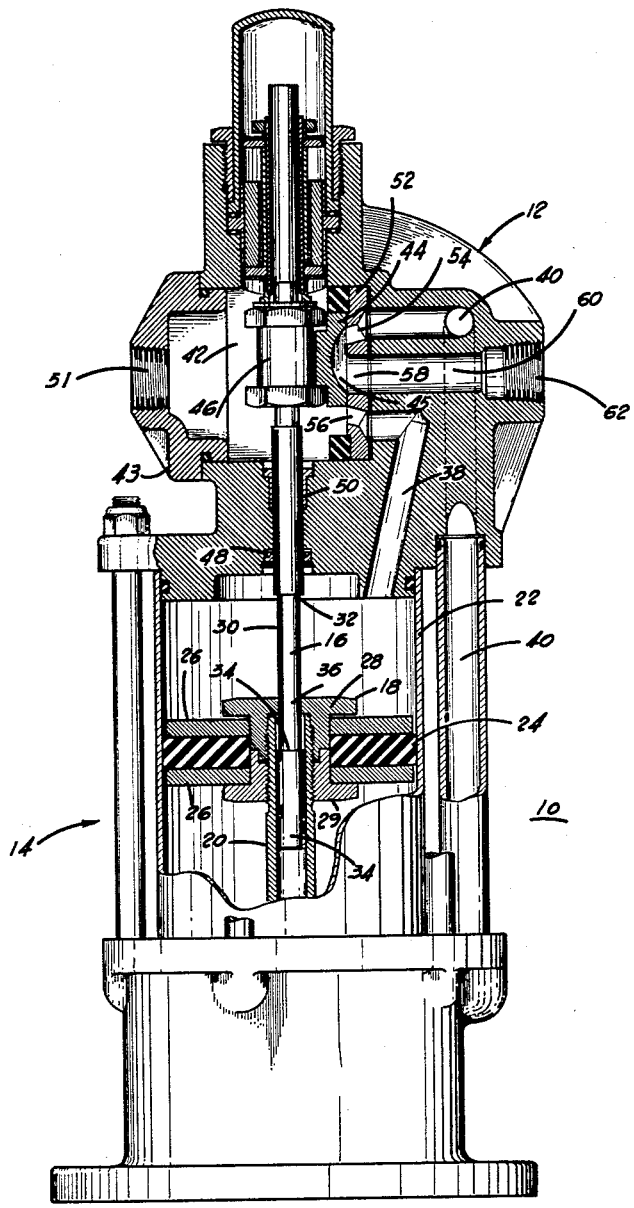
Figure 1 is a vertical section of a fluid motor showing one embodiment of this invention.

Looking now to the drawings, there is shown in Figure 1 a fluid pressure-operated, reciprocating motor 10 including a D-slide valve supporting and fluid supply portion 12, which is generally formed of cast metal or the like, and a reciprocating piston and cylinder assembly portion 14. A central reciprocating trip rod 16 is positioned within the motor 10 along a vertical axis and is coupled at the bottom end with a working piston assembly 18. A hollow shaft 20 is rigidly attached to the piston assembly 18 allowing the air motor to be coupled at the end device, in this case a lubricant pump (not shown). The piston assembly 18 reciprocates vertically within cylinder 22 and comprises a central resilient rubber disc 24 which is sandwiched between a pair of thin metal discs 26. The disc elements 24 and 26 are coupled to the hollow shaft 20 by flanged coupling members 28 which are threadedly engaged by the hollow shaft 20. The resilient disc member 24 has an outside diameter which is slightly in excess of the internal diameter of cylinder 22 and forms a seal therebetween. The central trip rod or shaft 16 has a reduced diameter portion as at 30 so as to provide an upper shoulder 32 and a lower shoulder 34. The extreme lower or tip portion 34 of the central trip rod 16 is of a diameter approximately the same as the internal diameter of the hollow shaft 20. This allows the trip rod 16 to slide freely within the hollow shaft 20. The upper flange coupling member 28 includes a central bore 36 which is of a diameter approximately the same as the diameter of the reduced cross section portion 30 of the central trip rod. As the main piston rod reciprocates in response to high pressure fluid entering the working cylinder 22 alternately on either side of the piston assembly 18, the piston assembly 18 will move freely with respect to the trip rod 16 until the upper flange member 28 contacts either shoulder 32 or shoulder 34, and thereafter the piston assembly 18 will tend to drive trip rod 16 either up or down, depending upon the direction of travel of the piston assembly 18 at this time. Associated with the working clyinder 22 and located at the upper end thereof, within cast portion 12 is a fluid-conducting duct 38 allowing high pressure fluid to be delivered to the upper surface of the piston assembly 18. Likewise, fluid may be delivered to the lower surface of piston 18 within the working chamber of cylinder 22 through the vertical duct 40 which extends generally parallel to the main working cylinder 22.

In order to supply high pressure fluid to the working cylinder, there is provided within the D-slide valve supporting and fluid supply portion 12 a central, pressurized cavity 42 closed by a plug 43. The cavity 42 receives the reciprocating D-valve and its operator. The central trip rod 16 extends upwardly through the cavity 42, passing through valve operator 46 in a manner to be described hereinafter. Suitable seals 48 and 50 are provided within the cast portion 14 between the reciprocating rod 16 and the cast housing to prevent the escape of high pressure fluid from within the working chamber to the cavity 42 through the rigid trip rod 16. In general, fluid is delivered to the valve body through inlet connection 51 where it is delivered to either side of the working piston assembly 18 through ducts 38 and 40. A valve seat member 52 is positioned one side of the cavity 42, the valve seat member 52 having three spaced apertures 54, 56 and 58 formed therein. The high pressure fluid entering the cavity 42 is delivered to upper duct 40 or lower duct 38, depending upon the position of the D-slide valve 44. The central aperture 58 is positioned adjacent the laterally extending duct 60 which communicates to the atmosphere through threaded nozzle 62. In general, the high pressure fluid surrounds the valve operator 46 and enters either the upper or lower duct delivering high pressure fluid alternately to the upper or lower working surface of piston assembly 18. In response to movement of the piston assembly 18, the valve operator moves to a new position which acts to move the D-slide valve from one operative position to the other. Movement of the D-slide valve 44 provides an access for discharge to the atmosphere of the high pressure fluid from the working surface of the piston assembly 18, while at the same time allowing additional high pressure fluid to be directed to the opposite side of the piston assembly from the other supply duct.

Figures 2, 3, 4:
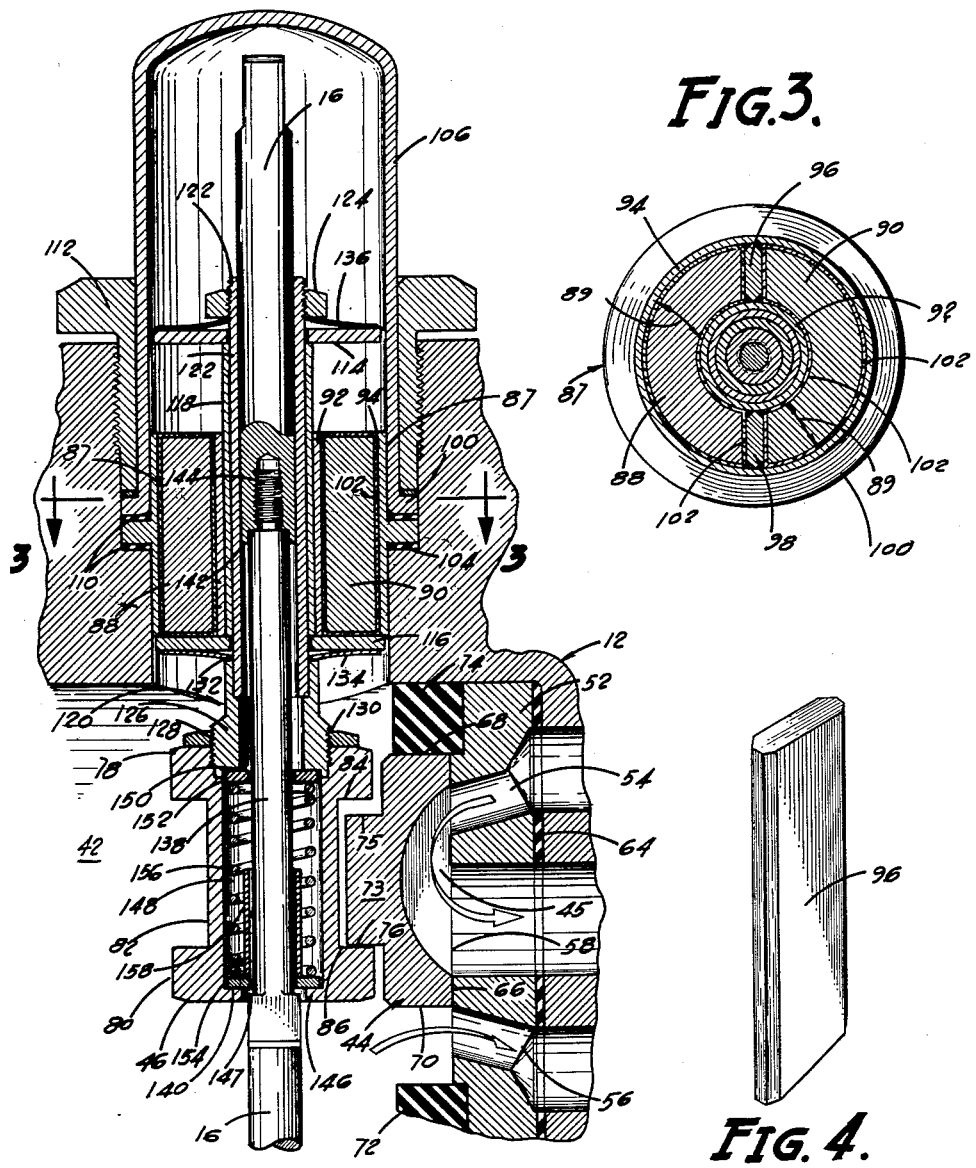
Figure 2 is a vertical section of a portion of the apparatus shown in Figure 1.
Figure 3 is a horizontal section taken along line 3—3 of Figure 2.
Figure 4 is a perspective view of a bridge or spacer employed with the magnetic circuit of the embodiment shown in Figures 2 and 3.

The present invention is directed to a magnetic snap acting mechanism for positioning the D-slide valve in either of its operating positions. Referring now to Figure 2, of the drawing, which shows one embodiment of the magnetic mechanism in detail, there is shown positioned within the cavity the valve seat member 52 having aligned ports 54, 58 and 56. Sealing means 64 may be positioned between the valve seat member 52 and the housing 12. The inner surface 66 of the valve seat member 52 is raised and may be readily ground or lapped so as to provide a smooth surface for engagement with the D-slide valve 44. The D-slide valve 44 is generally rectangular in construction and includes top and bottom surfaces 68 and 70, respectively, which engage a pair of transversely extending resilient lock members 72 and 74 which act to absorb some of the impact forces exerted by the rapidly moving D-slide valve 46. The D-slide valve 44 includes an inwardly projecting central portion 73 at the rear thereof which forms an upper contact surface 75 and a lower contact surface 76. Embracing this projection or tab portion 73 is the D-slide valve operator 46 which is generally spool shaped, having upper land 78 and lower land 80. The intermediate reduced cross section portion 82 is of a length slightly greater than the vertical height of the projection 73 formed on the inner surface of the D-slide valve 44. Lands 78 and 80 therefore form contact surfaces 84 and 86 which mate with the contact surfaces 75 and 76 formed upon the D-valve. It is apparent, therefore, that there is a small amount of free play between the D-slide valve 44 and the valve operator 46.

While the valve operator 46 surrounds the trip rod 16, there is no direct contact between the valve operator 46 and the main rod 16, and the hollow valve operator 46 is mounted for limited reciprocatory movement on the valve operating trip rod 16. The valve actuating mechanism comprises a magnetic pole assembly 87 including a pair of arcuate ceramic magnets 88 and 90, which are positioned within the upper portion cavity 42 so as to surround the reciprocating trip rod 16. The magnetic structure further comprises an inner cylindrical pole piece 92 and an outer cylindrical pole piece 94 constructed of cold rolled steel or the like which are held in fixed relationship by means of the metallic bridge pieces or spacers 96 and 98 which are best seen in Figures 3 and 4. The bridge pieces tie the pole-pieces together and may be brazed in place. They are constructed of non-magnetic material such as stainless steel or bronze. The magnetic structure including the inner cylindrical pole-piece 92, the ceramic magnets 88 and 90 and the outer cylindrical pole-piece 94 are rigidly or fixedly positioned within the cast housing 12. In order to permanently fix the magnetic structure, the outer cylindrical pole-piece includes a central outwardly directed flange portion 104. As mentioned previously, while magnetic means have been employed in the past for providing a snap action to a valve, such prior arrangements are unable to withstand relatively large shock forces associated with the rapidly moving, relatively large elements of the larger reciprocating air motors. The present invention makes use of a cushioning material 102, such as rubber or plastic composition, which completely surrounds the magnets and protects the ceramic magnets from the shock forces exerted by the moving elements. The magnetic pole assembly 87 is positioned within the upper portion of cavity 42 by placement of the projecting flange 100 formed on the outer surface of the outer pole-piece within the enlarged recess 104 formed in the upper part of the casting 12. A suitable end cap 106 extends downwardly and has a terminal flange portion 108 which abuts the upper surface of flange 100. As indicated, a pair of annular sealing rings 110 are positioned on either side of the flange 100 between the flange and the housing 12 and the end cap 106. A suitable threaded locking nut 112 threadedly engages the bore 104 securely positioning the magnetic pole structure within the cavity at this point. The rubber cushioning means 102, the pole-pieces 92 and 94 and the spacers 96 and 98 extend beyond the ceramic magnets 88 and 90 such that the magnets are isolated from the impact forces and the pole pieces and the other magnetic supporting structure absorb the shock.

Cooperating with ceramic magnets 88 and 90 are two reciprocable disc-like armatures 114 and 116, the armatures being spaced from each other a distance greater than the vertical length of the magnetic pole structures. The armatures are mounted on a tubular spacer 118 such that either one or the other armature 114 and 116, but not both may contact the ends of the pole pieces at any given instant. The tubular spacer 118 and the armatures 114 and 116 are carried by the reciprocating shuttle assembly generally designated at 120. The assembly 120 includes a second, tubular member 122 which is positioned between the reciprocating trip rod 16 and the tubular spacer 118. The coaxial member 122 is threaded at the upper end to receive a nut 124. At the lower end, the tubular member 122 is received within a cooperating hollow cylindrical member 126. The member 126 has a threaded exterior surface at 128 such that it may be threadedly received within a suitable opening formed in the upper land 78 of the valve operator 46. A suitable locking nut 130 is provided for securing the cylindrical member 126 to the valve operator 46.

Since the armatures 114 and 116 are adapted for cyclically impacting alternate ends of the magnetic pole assembly 87, suitable means are provided for resiliently mounting the armatures. The upper end of cylindrical member 126 forms a shoulder 132 which is adapted to receive a suitable annular spring washer 134 which tends to bias the lower armature 116 away from the stop or shoulder 132. The tubular spacer 118 contacts the upper surface of armature 116 at this point. Upper armature 114 contacts the upper end of the spacer tubing 118 and a second spring washer 136 is positioned on the upper side of the armature 114 and the two armatures with their spacer member 118 are resiliently held in assembled relation by the adjustable threaded nut 124. This particular arrangement provides a means whereby the shock forces normally associated with the moving armatures 114 and 116 hitting the relatively stationary magnetic pole assembly may be taken up by the biasing washers 134 and 136 which will flex slightly at the moment of contact. When contact occurs such as during the downward movement of the trip rod 16, the bottom surface of armature 114 will strike the upper end of the magnetic pole assembly 87. The force of the armature 114 striking the assembly 87 is absorbed longitudinally by the pole pieces 92 and 94 and spacers 96 and 98 all of which are engaged by the armature 114. The armature does not come in contact with the magnets 88 and 90. The pole pieces are supported by a cushioning material 104 and the magnets are supported within the resilient material 102. Hence very little of the shock force is transmitted to the magnets. The momentum of the tubular member 122 and the nut 124 is absorbed to a great extent by the resilient washer 136.

As mentioned previously, the valve operator or shuttle 46, is hollow, such that it embraces the trip rod 16. The trip rod 16 is narrowed or has a reduced cross section portion 138 at the point where it enters the valve operator 46. The reduced cross section portion 138 continues for a length which is dependent upon the desired travel of the main working piston 18. As such, there is formed a lower shoulder 140, and an upper shoulder 142, these shoulders acting in a manner to be described hereinafter to move the shuttle assembly 120 in response to movement of the trip rod 16. While the upper portion of the centrally located trip rod 16 is shown in threaded engagement with the reduced cross section portion 138, at 144, this arrangement is purely arbitrary and acts as a means to facilitate assembly.

In order to provide the required snap action, the hollow valve operator 46 includes an inwardly directed flange portion 146 at the lower end of bore 148 forming a suitable shoulder 147, while the intermediate cylindrical member 126 has its inner diameter somewhat less than the internal diameter of the bore 148 forming a second shoulder 150. Positioned adjacent the shoulder 150, within the bore 148, is a first washer member 152 having an external diameter approximately equal to the diameter of the bore 148. The internal diameter of the washer 152 is slightly in excess of the reduced cross sectional diameter of portion 138 of the main piston rod 16. As such, the reduced cross section 138 is free to move within the washer, but sufficient downward movement of trip rod 16 will move the washer 152 vertically within the bore 148. In like manner, a second washer 154 is positioned at the bottom of bore 148 and has an internal diameter and external diameter of like dimensions to washer 152. A compression spring 156 is positioned within bore 148 between the washers and acts to exert a compressive force against the upper washer 152, pressing it against shoulder 150 while exerting a like compressive force upon washer 154 at the bottom of bore 148 tending to force it against the shoulder formed by the flange 146. A cylindrical member 158 is coaxially positioned within bore 148 between the coil spring 156 and the reduced cross sectional portion 138 of rod 16. The cylindrical member 158 is free to move in an axial direction. It is apparent therefore that as the piston rod 16 moves downwardly, there is a point when the shoulder 142 will contact the upper surface of washer 152 causing the washer to compress the spring by further downward movement of the rod 16. However, the washer will travel a distance which is limited by the washer 152 contacting the upper end of the cylindrical member 158. Further downward movement of washer 152 and further compression of spring 156 is prevented. In like manner, upward movement of rod 16 causes shoulder 140 to contact the lower surface of washer 154 also compressing the spring. The compression of the spring and movement of the washer causes the cylindrical member 158 to rise until the upper surface of the upper end of the cylindrical member 158 contacts the lower surface of washer 152. Further relative movement of the rod 16 with respect to the valve operator 46 is prevented. After either of these two extreme positions has been reached, any further movement of the trip rod 16 in either direction will result in movement of the valve operator 46.

In operation, the cooperative action of the fixed permanent magnet assembly, the reciprocating armatures and the periodic compression of compression spring 156 results in a magnetic snap acting valve movement of the D-slide valve having advantages previously mentioned. Assuming that the piston assembly 18 has moved upwardly in response to high pressure fluid on the bottom side thereof, to the uppermost position, and that the rod 16 and its associated elements are ready to start a downward stroke, they will be in the position as shown in Figure 2. Shortly after the piston assembly 18 starts its downward motion, the shoulder on the upper coupling member 28 contacts shoulder 34 formed on the trip rod 16 starting the trip rod 16 on its downward movement with the piston assembly 18. There is thus provided a lost motion connection between the piston assembly 18 and the trip rod 16. As the trip rod 16 moves downwardly with piston assembly 18, the reduced cross sectional portion 138 of trip rod 16 is moving relative to the shuttle assembly 120. However, when shoulder 142 at the upper end of the reduced cross section 138 contacts the upper surface of washer 152, the washer 152 will move downwardly within bore 148 of the valve operator 46. This results in compression of biasing spring 156 since the bias of the biasing spring, even when fully compressed, is insufficient to move the shuttle assembly 120 and its associated armature 116 away from the bottom surface of the fixed magnetic pole assembly 87. Continued downward movement of this assembly 18 results in the bottom surface of washer 152 contacting the upper end of sleeve 158. Further compression of the spring is prevented and relative movement of trip rod 16 and the shuttle assembly 120 ceases. At this point, continued further movement of the trip rod 16 which is now rigidly coupled to the shuttle assembly 120 will cause the lower armature 116 to disengage from the pole pieces 92 and 94. As the armature 116 moves away from the pole pieces, the increasing air gap rapidly reduces the strength of the magnetic pull between the armature 116 and the fixed magnetic pole assembly 87. Compressed spring 156 now takes over and throws the shuttle assembly 120 forwardly ahead of it at a much faster rate than the movement of trip rod 16 which continues its downward movement in response to the high pressure fluid within the working chamber. During this snap action movement of the shuttle assembly 120, the assembly picks up the D-slide valve 44 since the lost motion between the D-slide valve and the valve operator 46 is taken up by the rapid movement of the shuttle assembly 120. When the contact surface 84 on the spool-shaped valve operator contacts surface 75 on the rearward extending projection 73 of the D-slide valve 44, the valve 44 is moved rapidly from its upper operating position to its lower operating position. As a result, the high pressure fluid which was delivered to the upper side of the piston assembly 18 is now exhausted to the atmosphere through delivery duct 38, the crescent-shaped or scalloped portion 45, port 58, and exhaust duct 60 to the atmosphere. The high pressure fluid present continuously within the valve body 42 now enters the upper port 54 and passes into the vertically extending duct 40 where it is delivered to the bottom face of piston assembly 18, where a reversal in direction of movement of the piston assembly 18 and its associated trip rod 16 takes place. After the lower armature 116 snaps away from the magnetic assembly 87, the compression spring 156 expands to the point where the upper washer 152 again contacts shoulder 150 formed in the intermediate cylindrical member 126. At the same time, the shuttle assembly 120 moves downwardly to an extent where the air gap between the magnetic field assembly 87 and the upper armature 114 is less than the gap between the lower armature 116 and the bottom portion of magnetic field assembly 87. At this point, the magnetic attraction between the fixed magnetic field assembly 87 and the upper armature is greater than that existing between the lower armature 116 and the same assembly, with the armature 116 moving rapidly away from the fixed field assembly. The attraction between the armature 114 and the fixed field assembly 87 now aids in causing the shuttle assembly 120 to move downwardly along with the initial kick provided by the expansion of the compression spring 156. As a result, armature 114 is snapped into position in contact with the upper terminal surface of the magnetic field assembly 87. Under normal circumstances, the resultant repeated impact of the armature against the fixed field pole assembly 87 would cause damage to the assembly as well as demagnetization of the magnet. However, the damage is prevented by the resilient support of the armatures and the resilient shield surrounding the ceramic magnets.

After the D-slide valve has moved to its new operating position at the bottom of the valve body, such that the lower face 70 of the D-valve 44 is in contact with the resilient member 72, and high pressure fluid is now being supplied to the bottom surface of piston assembly 18, the direction of movement of the trip rod 16 will be reversed. Again, lost motion is provided between the piston assembly 18 and the trip rod 16. After the trip rod 16 starts its upward movement, it will move a predetermined distance prior to shoulder 140 contacting the lower surface of washer 154 within the valve operator 46. Further upward movement of piston assembly 18 will again cause the compression spring 156 to compress upwardly within bore 148. The freely slidable cylindrical member 158 will move upwardly until its upper surface contacts the bottom surface of washer 152. Further compression of spring 156 is thereby prevented as well as relative movement between the trip rod 16 and the shuttle assembly 120. At this point, continued upward movement of trip rod 16 results in disengagement of armature 114 from the face of the magnetic field assembly 87. As the upper armature 114 moves away from the magnetic field assembly, the attracting force between the armature and the magnetic field assembly decreases to the point where the biasing spring 156 takes over and acts to snap the shuttle assembly 120 and its associated valve operator 46 upwardly at a much faster rate than movement of trip rod 16. Again, the lost motion between the valve operator 46 and the D-slide valve is also taken up whereby contact surfaces 86 on the valve operator 46 and 76 on the D-slide valve contact each other causing the D-slide valve 44 to move rapidly to its upward position where face 70 contacts the resilient element 74. The resilient element 74 acts to dampen the force of impact of the rapidly moving D-slide valve. Again, when the armature 114 moves sufficiently away from the face of the fixed magnetic field assembly 87, the attracting force between the upwardly moving armature 116 and the fixed field assembly 87 becomes greater than the attracting force between armature 114 and the assembly 87. Thus, the attracting force between armature 116 and the fixed field assembly 87, as well as the expansion of compression spring 156, act together to move the shuttle assembly 120 into its new position with a snap action. The various lost motion connections of trip rod 16 provide the freedom of movement necessary. The combinations of the ring washers 134 and 136 along with the resilient support for the permanent field magnets 88 and 90 act to dampen the impact forces associated with the oscillating elements.

Because the armatures 114 and 116 must be spaced a distance such that the air gap existing at any given time between the magnetic field assembly 87 and either of the armatures 114 and 116, depending upon the position of the shuttle assembly 120, is equal to the distance that the shuttle assembly 120 moves, the magnetic field assembly must be constructed of special material. Under normal circumstances, the effect of such a large air gap would result in large demagnetizing forces operating to effectively demagnetize permanent magnets 88 and 90. The length of the air gap is equal to the sum of the lost motion distance between the valve operator 46 portion of shuttle assembly 120 and the D-slide valve 44 added to the distance that the D-slide valve 44 moves from one operating position to the other. The design contemplated in the preferred embodiment includes a pair of ceramic magnets 88 and 90. The ceramic magnets are characterized by a high coercive force and a low flux density in comparison with other commercially used high energy magnets such as conventional Alnico V. Because of the impact associated with the magnetic field assembly and because of the relatively large air gap existing at all times alternately on either side of the fixed magnetic field assembly 87, the characteristic of the ceramic magnetic material which is of most importance in the present application is its ability to withstand the large demagnetizing forces. The coercive force of the ceramic magnetic material which is preferably used in the present invention is approximately double that of Alnico V. Although its coercive force is high, the ceramic material has a considerable lower flux density than Alnico V and it is therefore desirable to design the magnets with a relatively large cross sectional area in the direction of polarization and a relatively short magnetic length. This is accomplished in the present design shown by using arcuately shaped magnets embracing almost a complete circle with the ceramic arcuate magnets being magnetized in a radial direction as indicated by arrows 89 to obtain a large cross sectional area for the space occupied while having a short but sufficient magnetic length for the purpose described. To illustrate this requirement, the formula for the holding power of a magnetic structure consisting of a movable armature and fixed pole pieces is expressed by $$P = \frac{B^2 A}{73,000,000}$$

where P is the magnetic coercive force in pounds, B is the flux density in Maxwells per square inch and A is the contact area in square inches. From this formula, it is clearly advantageous to use the highest possible flux density. Since the usable flux density in the ceramic magnet is relatively low, the high flux density desired is obtained by providing the pole pieces 92 and 94 of the embodiment shown in Figure 2 with a much smaller cross sectional area at the points of engagement with the armatures than the effective cross sectional area of the magnet. The cross sectional areas of the pole pieces at the points of engagement with the armatures is illustrated in Figure 2, that is, the extreme upper and lower ends of the magnetic field poles 92 and 94 where the moving armature contacts the fixed field pole assembly 87. As indicated in Figure 3, this cross sectional area is indicated by numerals designated areas 92 and 94.

Referring now to Figures 5 and 6, a second embodiment of the present invention is shown. The operation of this embodiment is identical to the operation of the embodiment shown in Figures 2 and 3. As such, cavity 42 is provided with a valve seat 52 having a raised valve seat surface 66 upon which rests the reciprocating D-slide valve 44. Again, the scalloped front surface 45 of the D-slide valve acts to cooperate with the ports 54, 56 and 58 in like manner to the previous embodiment. The trip rod 16 passes upwardly through the center of the valve body 42 and it is loosely coupled to shuttle assembly 120. The trip rod 16 includes reduced cross section portions 138 forming operating shoulders 140 at the lower end thereof and 142 at the upper end. The shoulders 142 reciprocate within the shuttle assembly 120 and contact upper and lower washers 152 and 154, respectively. The valve operator 46 is again spool shaped and includes lands 78 and 80 with the intermediate reduced cross sectional portion 82. The lands 78 and 80 therefore form contact surfaces 84 and 86 which cooperate with contact surfaces 74 and 76 formed on projection 73 of the D-slide valve 44. A central bore 148 is provided with the spool-shaped valve operator 46 which holds the washers 152 and 154 for axial reciprocation therein. In like manner to the embodiment shown in Figure 2, there is provided a compression spring 156 forcing the washers 152 and 154 to the extreme ends of the bore 148. A cylindrical member 158 is mounted coaxial of the reduced cross section portion 138 of trip rod 16 for restricting the compression of spring 156 within bore 148. The main difference between this embodiment and that shown in Figure 2 resides in the magnetic field pole assembly 171 and its associated moving armatures. The housing 12 includes an elongated slot 160 which is formed along a horizontal axis and extends laterally across the housing 12. The upper portion of this slot 160 is open and is adapted to receive a cast end cap member 162. The cap 162 includes a flanged bottom portion 164 and a rounded dome portion 166. The hollow dome portion is adapted to receive the reciprocating trip rod 16 which moves upwardly therein. Suitable bolts 168 are provided for securing the end cap 162 on to the cast housing 12. Suitable sealing means 170 may be provided between the end cap and the main housing 12. Instead of making use of a pair of arcuate ceramic magnets such as 88 and 90 in the embodiment shown in Figure 2, rectangular magnetic elements 172 which are also formed of the same ceramic material which form the arcuate magnets are provided in the present embodiment. As indicated best in Figure 6, the rectangular ceramic magnets 172 are positioned between field pole pieces 174 and 176 by means of conventional rivets 178 which extend completely through the magnets and the associated field poles 176 and 174. In like manner to the embodiment of Figure 2, the ceramic magnets are separated from the pole pieces by suitable rubber gaskets 180 which are positioned on either side of the ceramic magnets 172. In this way, the ceramic magnets are cushioned in order to dampen the impact forces caused by the rapidly moving armature striking the fixed magnet field pole assembly 171. In order that the field poles 174 and 176 may closely surround the moving shuttle assembly 120 and its associated annular armatures 114 and 116, the pole pieces which are formed of cold rolled steel strips or the like are curved at the centers thereof allowing the tubular members 118 and 120, as well as the trip rod 16, to pass therethrough. In like manner to the ceramic magnet field assembly 87 of Figures 2 and 3, the ceramic magnets 172 are magnetized across their shortest distance, that is, from one side to the other, as indicated by arrows 182 in Figure 6. Again, it is desirable to design the magnets with a large cross sectional area in the direction of polarization and a relatively short magnetic length. In the embodiment shown in Figures 5 and 6, this is accomplished by using the rectangular magnet, the pole pieces being in strip form and having relatively narrow edges which are in contact with the annular armatures 114 and 116 associated with the reciprocating shuttle assembly 120. The magnetic field assembly 171, within the elongated slot 160, includes a resilient gasket 186 or the like positioned between the flange portion 164 of end cap 162 and the assembly 171. The resilient member 186 acts in conjunction with resilient cushioning material 180 which surrounds the permanent magnets to prevent a shock being transferred to the magnets as a result of the impact forces generated by the moving armatures 116 and 114 which slap against the relatively rigid magnetic field assembly 171. The operation of the moving armatures in conjunction with the magnetic field generated by assembly 171 in cooperation with the biasing spring 156 is identical to the operation as described previously in regard to the embodiment shown in Figure 2. The combined efforts result in a rapid accelerated movement of the D-shaped slide valve between one operative position and the other in response to oscillation of the piston assembly 18. Again, the relatively large air gap between the moving armatures 114 and 116 and the magnetic field assembly 171 calls for a high coercive force permanent magnet assembly. As noted previously, the rectangular magnets are also formed of the same ceramic material in which the coercive force is approximately double that of Alnico V. The use of such magnets and in conjunction with the arrangement for embedding said magnets in cushioning material so as to protect them from the shock caused by the rapidly moving armatures hitting the permanent magnet assembly results in a magnetic snap acting valve in which repeated continuous operation may be achieved without the danger of demagnetizing the permanent magnet or appreciable reduction of the magnetic power of the magnetic field assembly.

While there have been shown and described and pointed out the fundamental novel features of the invention as applied to preferred embodiments, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In combination, a fluid pressure-operated motor including a reciprocating piston and cylinder assembly, a D-slide valve for admitting fluid pressure alternately to each end of said cylinder and means for moving said D-slide valve between two operating positions with a snap action comprising a shuttle assembly including a valve operator adapted to contact said D-slide valve upon movement of said shuttle assembly, magnetic means fixably positioned adjacent said shuttle assembly acting to attract and hold said shuttle assembly in either of two positions, biasing means for biasing said shuttle assembly away from each of said magnetically held positions, means connecting said fluid operated piston and said shuttle assembly, said means acting upon movement of said piston to aid said biasing means in overcoming said magnetic attraction in either of said two positions to thereby cause said shuttle assembly to break away from said magnetic attraction to snap actuate said D-slide valve from one operative position to another.

2. Apparatus as claimed in claim 1, wherein said shuttle assembly includes a pair of spaced armatures, said magnet means positioned between said armatures with said armatures adapted to alternately contact opposite ends of said magnet means in response to oscillation of said piston.

3. Apparatus as claimed in claim 1, wherein said magnet means comprises at least one permanent magnet, said permanent magnet being completely imbedded in a resilient material.

4. Apparatus as claimed in claim 1, wherein said means connecting said fluid actuated piston comprises an elongated oscillating rod, said shuttle assembly includes a tubular portion positioned coaxially of said rod and adapted to reciprocate thereon, said shuttle assembly further includes a pair of annular disc-like armatures positioned on said tubular portion and adapted to reciprocate therewith, said annular armatures being positioned on either side of said magnet means and adapted to alternately contact opposite ends of said magnet means upon oscillation of said trip rod and said shuttle assembly.

5. Apparatus as claimed in claim 4, including resilient biasing means positioned between said disc-like armatures and said shuttle assembly, whereupon said armatures move axially against said biasing means when the moving armatures alternately contact the ends of said magnet means.

6. Apparatus as claimed in claim 5, wherein said magnetic means comprises a pair of semi-cylindrical permanent magnets positioned coaxially of the tubular portion of said shuttle assembly, said permanent magnetic means includes an inner cylindrical pole-piece positioned between said pair of cylindrical permanent magnets and said tubular portion of said shuttle assembly, said magnetic means further includes a second cylindrical pole-piece surrounding the outer surface of said pair of semi-cylindrical magnets, and said pole-pieces extend slightly beyond said semi-cylindrical permanent magnets at either end thereof, whereby said pole-pieces provide an increased flux density at the terminal ends in contact with said annular disc-like armatures.

7. Apparatus as claimed in claim 6, wherein said pair of semi-cylindrical magnets are imbedded in a resilient material.

8. Apparatus as claimed in claim 6, wherein said magnet means includes a thin layer of resilient material positioned between said semi-cylindrical permanent magnets and said cylindrical magnetic pole pieces.

9. Apparatus as claimed in claim 4, wherein said semi-cylindrical permanent magnets are composed of ceramic material.

10. Apparatus as claimed in claim 1, wherein said biasing means comprises a compression spring positioned between the shuttle assembly and said means connecting said fluid actuating piston and said shuttle assembly, said compression spring acting to bias said shuttle assembly to an intermediate position upon said connecting means, and means positioned on said connecting means for compressing said compression spring in response to relative movement of said connecting means with respect to said shuttle assembly.

11. Apparatus for causing a D-slide valve to move from one operative position to another within a reciprocating fluid pressure-operated motor, with a snap action, said apparatus comprising; an oscillating trip rod connected to said reciprocating fluid pressure-operated motor, a shuttle assembly carried by and slidable on said trip rod, said shuttle assembly movable to either of two extreme positions, spring means between said trip rod and said shuttle assembly for biasing said shuttle assembly to a position intermediate of said extreme positions, a permanent magnet assembly fixably positioned adjacent said shuttle assembly, a pair of armatures positioned on said shuttle assembly on either side of said permanent magnet assembly for alternately contacting opposite sides of said permanent magnet assembly, means on said trip rod for compressing said spring means in either of two directions during oscillation of said trip rod, the bias of said spring means opposing the magnetic attraction of said armatures but being insufficient to overcome said magnetic attraction, said means being operable before the end of each oscillatory stroke to directly contact said shuttle assembly to overcome the magnetic attraction of said magnetic assembly thereby allowing said spring means to move said shuttle assembly in a snap acting manner, and means connecting said shuttle assembly and said D-slide valve, whereby said D-slide valve is oscillated between two operative positions.

12. Apparatus as claimed in claim 11, wherein said permanent magnet assembly comprises a ceramic magnet structure, said ceramic magnet structure being completely imbedded in a resilient material.

13. Apparatus as claimed in claim 11, wherein said shuttle assembly includes a tubular portion, said tubular portion being coaxial of said trip rod and positioned between said trip rod and said permanent magnet assembly, said armatures comprising a pair of spaced, annular disc-like members positioned upon said tubular portion of the shuttle assembly, and adapted to alternately contact opposite ends of the permanent magnet assembly.

14. Apparatus as claimed in claim 13, further including means resiliently mounting said annular disc-like armatures upon said shuttle assembly whereby the impact forces of the said armatures alternately contacting the opposite sides of said permanent magnet assembly are absorbed by said resilient means.

15. Apparatus as claimed in claim 13, wherein said permanent magnet assembly comprises a pair of semi-cylindrical ceramic magnets positioned coaxially of said tubular portion of said shuttle assembly between the annular disc-like armatures, said ceramic magnets being imbedded in a resilient material.

16. Apparatus as claimed in claim 15, wherein said semi-cylindrical ceramic magnets are magnetized in a radial direction at right angles to the axis of said semi-cylindrical magnets.

17. Apparatus as claimed in claim 16, wherein said permanent magnet assembly includes an inner cylindrical pole-piece positioned between said tubular portion of said shuttle assembly and said imbedded permanent magnet, and a second cylindrical pole-piece positioned coaxially of said permanent magnet in contact with the outer peripheral surface thereof, whereby high density flux is present at either end of the cylindrical pole-pieces adjacent said disc-like armatures, the ends of said pole-pieces extending slightly beyond the ends of said cylindrical permanent magnet, whereby the impact forces transmitted from the reciprocating disc-like armatures are passed to the pole-pieces rather than to the permanent magnets.

18. Apparatus as claimed in claim 11, wherein said permanent magnet assembly comprises a pair of rectangular, ceramic magnets positioned on either side of the shuttle assembly with the longitudinal axis of the magnets being at right angle to the axis of the oscillatory trip rod, said permanent magnet assembly further including a pair of flat, rectangular pole-pieces coupled to said permanent magnets on either side thereof, the central portion of the pole-pieces being curved to surround said shuttle assembly and said oscillatory trip rod whereby high density flux is conducted from said permanent magnets to said armatures.

19. Apparatus as claimed in claim 18, wherein said permanent magnet assembly includes a thin strip of resilient material positioned intermediate of the ceramic permanent magnets and the magnetic pole-pieces, said resilient material acting to protect said permanent magnet from the shock forces set up by the armature alternately contacting the permanent magnet assembly.

20. Apparatus as claimed in claim 11, wherein said shuttle assembly includes a tubular portion, said tubular portion being positioned coaxially of the trip rod and reciprocable therewith, said armatures comprising a pair of spaced annular disc-like members positioned on the tubular member on either side of the permanent magnet assembly and adapted to contact opposite ends of said permanent magnet assembly alternately in response to oscillation of said trip rod.

21. Apparatus as claimed in claim 20, including means for resiliently mounting said annular armatures on the tubular member, said resiliently mounting means acting to absorb said shock forces within the apparatus when said armatures alternately contact said fixed permanent magnet assembly.

22. Apparatus as claimed in claim 18, wherein said permanent magnet assembly is resiliently supported within said apparatus.

23. Apparatus for causing a D-slide valve to move from one operative position to another with a snap action, said apparatus comprising; an oscillatory trip rod connected to a fluid operated piston, a shuttle assembly carried by and slidable with said reciprocating trip rod, said shuttle assembly movable to either of two extreme positions, said shuttle assembly including a portion having an enlarged bore, said oscillatory trip rod including a reduced cross section portion adapted to reciprocate within the shuttle assembly, a pair of washers positioned within the bore and slidable therein, said washers positioned coaxially of the reduced cross section portion of the trip rod, a compression spring positioned within the bore on said rod and adapted to bias said washers to either end of said bore, a cylindrical member positioned coaxially of the reduced cross section portion of said rod within said bore and freely slidable therein between the trip rod and said compression spring, a permanent magnet assembly fixably positioned adjacent said shuttle, a pair of armatures carried by the shuttle assembly and adapted to alternately contact opposing sides of said permanent magnet assembly, said magnet assembly acting to attract and to hold said armatures against said permanent magnet assembly, the attraction of said permanent magnet assembly being greater than the spring biasing force of said compression spring when fully compressed, said trip rod oscillating between two extreme positions whereby movement of said trip rod in either direction acts first to move said washers inwardly toward each other against the bias of the compression spring, until said washers contact the ends of the cylindrical member, whereby further movement of the trip rod in said same direction causes said attracted armature to move away from the permanent magnet assembly thereby allowing the compression spring to move the shuttle assembly in a snap acting manner away from the permanent magnet and means connecting said shuttle assembly and said D-slide valve to impart said snap action to the D-slide valve.

References Cited in the file of this patent
UNITED STATES PATENTS

| | | |
|---|---|---|
| 2,409,112 | Dillman | Oct. 8, 1946 |
| 2,443,568 | Palm | June 15, 1948 |
| 2,466,583 | Dillman | Apr. 5, 1949 |
| 2,664,246 | Ray | Dec. 29, 1953 |
| 2,707,456 | Schweisthal | May 3, 1955 |